United States Patent [19]

Ulschmid et al.

[11] Patent Number: 5,251,427
[45] Date of Patent: Oct. 12, 1993

[54] CROP HARVESTER PLANT DEFLECTOR ASSEMBLY

[75] Inventors: Timothy G. Ulschmid, Oak Creek, Wis.; Earl R. Snyder, Bolingbrook, Ill.

[73] Assignee: Case Corporation, Racine, Wis.

[21] Appl. No.: 865,558

[22] Filed: Apr. 8, 1992

[51] Int. Cl.$^5$ .......................................... A01D 46/08
[52] U.S. Cl. ............................................ 56/1; 56/28; 56/DIG. 9; 56/DIG. 24
[58] Field of Search ............... 56/1, 14.7, 28, DIG. 9, 56/DIG. 24; 460/120

[56] References Cited

U.S. PATENT DOCUMENTS

| | | | |
|---|---|---|---|
| 2,616,353 | 11/1952 | Thomann | 56/14.7 X |
| 3,200,572 | 8/1965 | Sweet | 56/28 |
| 3,533,224 | 10/1970 | Keck | 56/28 |
| 3,901,325 | 8/1975 | Richards | 172/81 |
| 3,927,514 | 12/1975 | Sammet | 56/327.2 |
| 3,985,186 | 10/1976 | Lee | 172/81 |
| 4,026,366 | 5/1977 | Doughty | 172/511 |
| 4,199,927 | 4/1980 | Craig et al. | 56/1 X |

Primary Examiner—George A. Suchfield
Attorney, Agent, or Firm—Rudnick & Wolfe

[57] ABSTRACT

A plant deflector assembly adapted for mounting to an open frame of a row crop harvester which is movable over a field of plants. The plant deflector assembly includes a series of fore-and-aft spaced elongated deflector members which are adapted to pass beneath at least a portion of a drive assembly on the harvester and extend transversely across a frame of the harvester for vertically deflecting and inhibiting plants passing beneath the harvester from rising into contact with the drive assembly and becoming entangled therewith. The series of spaced deflector members are mounted to extend from an area adjacent a forward end of the harvester frame and extend rearwardly to an area adjacent an engine forming part of the drive assembly. The plant deflector assembly may further include a mounting apparatus adapted for securement to the frame of the harvester and to which the plant deflector members are secured. The mounting apparatus preferably includes at least two fore-and-aft extending and generally parallel arms defining a series of mounting holes which promote releasable securement of the plant deflector members thereto.

11 Claims, 4 Drawing Sheets

CROP HARVESTER PLANT DEFLECTOR ASSEMBLY

FIELD OF THE INVENTION

The present invention generally relates to row crop harvesters such as cotton harvesters and the like and, more particularly, to a plant deflector assembly for inhibiting plants passing beneath the harvester from entangling about operative components arranged on an open frame of the harvester.

BACKGROUND OF THE INVENTION

Row crop harvesters, such as cotton harvesters and the like, are typically equipped on their underside with an open frame on which a drive assembly including an engine and transmission is mounted. The frame extends in a fore-and-aft direction relative to the harvester and includes a pair of front wheels and a pair of rear wheels. To maintain a low center of gravity and to reduce the overall height of the harvester thereby allowing passage through barn doors and the like, the underside of the frame is arranged close to the ground surface over which the harvester moves.

The row crop harvester further includes a plurality of fore-and-aft extending harvesting units mounted in side-by-side order relative to each other and extending across the width of the harvester frame. Recent improvements in cotton harvesters allow the transverse spacing between the row units to be readily changed or adjusted to accommodate variations in row spacings between different fields.

Cotton plants grow to a substantial height and as the harvester is driven across the field, the plants pass through a passage provided on each harvesting unit. After passing through the harvesting units, the plants pass beneath the open frame of the harvester. Depending upon their height, the distal or upper portion of the plants are vertically deflected as the harvester passes thereover. In many instances, however, the resiliency of the plant often causes the plant's distal end and/or foliage thereon to extend through the open frame of the harvester and into the engine compartment of the harvester.

Because of the numerous operating components on the harvester, especially in the area of the engine and transmission, plants and foliage thereon often become entangled with the engine and other operating components of the harvester. Such entanglement can often damage the foliage on the plants and often reduces or even halts operating time for the harvester until the entangled foliage is removed from the operating components. Of course, during harvesting conditions, operating time of the harvester is at a premium and any unwarranted slow down or stoppages prove costly to the overall harvesting operation.

The problem of plants and foliage entangling with operating components of the drive train has been recognized in the art. Therefore, some row crop harvesters are equipped on their underside with open sided ducts or channels. These ducts or shields inhibit the plants and foliage thereon from becoming entangled with operating components of the harvester. The ducts or channels are usually fabricated from elongated sheets of metal which are fixed to the underside of the harvester frame and extend substantially parallel to the length of the harvester.

Such channels or ducts are fixed to the underside of the harvester frame in accordance with the row spacings of the harvesting units. As mentioned above, however, recent improvements in crop harvesters has allowed the row spacings between adjacent harvesting units to be readily adjusted thereby adding a dimension of flexibility to the row crop harvesters. As will be appreciated, not all farmers may plant their row crops with exactly the same spacing between adjacent rows. The open ducts or channels on the underside of the harvester, however, are not readily movable as are the harvesting units. Thus, such ducts or channels detract from the versatility of the harvester.

Thus, there is a need and a desire for a plant deflector assembly for inhibiting plants passing beneath the harvester from entangling about the operative components arranged on the open frame of the harvester and which are readily adaptable to different row spacings between adjacent rows of plants.

SUMMARY OF THE INVENTION

In view of the above, and in accordance with the present invention, there is provided a plant deflector assembly adapted to be mounted to an open frame of a row crop harvester such as a cotton harvester. The open frame crop harvester is supported for movement over a plant field by pairs of front and rear wheels. At a front end, the harvester is provided with a plurality of harvesting units arranged in side-by-side order and extending substantially across the width of the frame. The harvester and harvesting units are powered by a drive assembly including an engine and transmission combination mounted on the open frame. The plant deflector assembly includes a series of fore-and-aft spaced elongated plant deflector members mounted to the frame to pass beneath at least a portion of the drive assembly and extend transversely across the frame for vertically deflecting and inhibiting plants passing beneath the harvester from rising into contact with operating components of the drive means and becoming entangled therewith. The series of spaced deflector members are mounted to the frame to extend from an area adjacent a forward end of the frame and extend rearwardly to an area adjacent the engine.

In a preferred form of the invention, each plant deflector member is fabricated from an elongated preferably tubular deflector piece mounted to the frame of the row crop harvester. An alternative embodiment for the plant deflector member includes extension pieces telescopically arranged at opposite ends of the elongated tubular deflector piece. The extension pieces can be telescopically moved relative to the elongated tubular deflector such that the operable length of each deflector member can vary as a function of the fore-and-aft position of the respective deflector member along the length of the open frame of the row crop harvester. In either embodiment, the elongated deflector piece and the extensions can be fabricated from hollow elongated tubular plastic or, hollow elongated metallic pieces to enhance their wear resistance.

In a preferred form of the invention, the plant deflector assembly further includes a mounting to which the series of fore-and-aft spaced plant deflector members are releasably secured. The mounting includes a pair of fore-and-aft extending and generally parallel arms. Each arm defines a series of fore-and-aft spaced mounting holes to facilitate released affixation of the plant deflector members thereto in an adjustable manner.

Suitable means releasably secure each plant deflector member to the mounting.

The fore-and-aft spacing between adjacent plant deflector members of the present invention provides manual access to the operating components of the drive means and is sufficient to inhibit plants and foliage thereon from becoming entangled with operating components of the drive means. The extensible/retractable configuration of the plant deflector member furthermore allows the operable length of each deflector member to be readily adjusted to fit the particular orientation on the open frame. Each plant deflector member is preferably configured of tubular deflector pieces which do not detract from the ground clearance provided for the harvester. Moreover, because the plant deflector members extend perpendicularly rather than parallel to the frame, the row spacings between adjacent harvesting units can be readily changed to accommodate different plant row spacings without requiring changes to the plant deflector assembly as heretofore required.

Numerous other features and advantages of the present invention will become readily apparent from the following detailed description, the accompanying drawings, and the appended claims.

DESCRIPTION OF A PREFERRED EMBODIMENT

Figure 1:
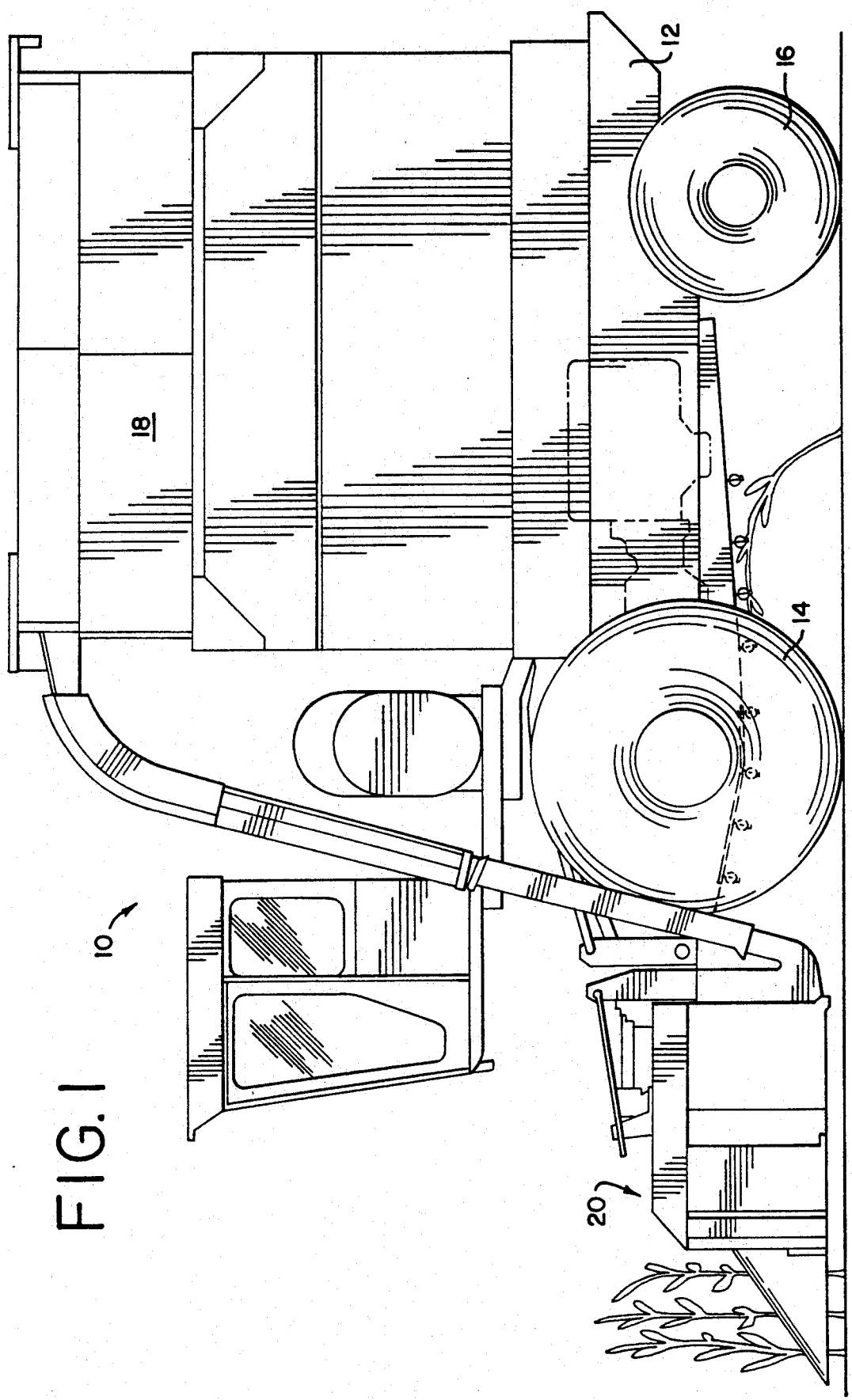
FIG. 1 is a schematic side elevational view of a row crop harvester, such as a cotton harvester.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, there is shown a row crop harvester which, in the illustrated embodiment, is shown as a cotton harvester 10. The cotton harvester 10 includes a fore-and-aft extending open frame 12 having an operator station 13 arranged at a forward end thereof. Frame 12 is supported for movement over a field of plants by transversely spaced drive wheels 14 and steering wheels 16. In the illustrated embodiment, a cotton receiving basket or receptacle 18 is mounted on the frame 12 rearwardly of operator station 13.

Figure 2:
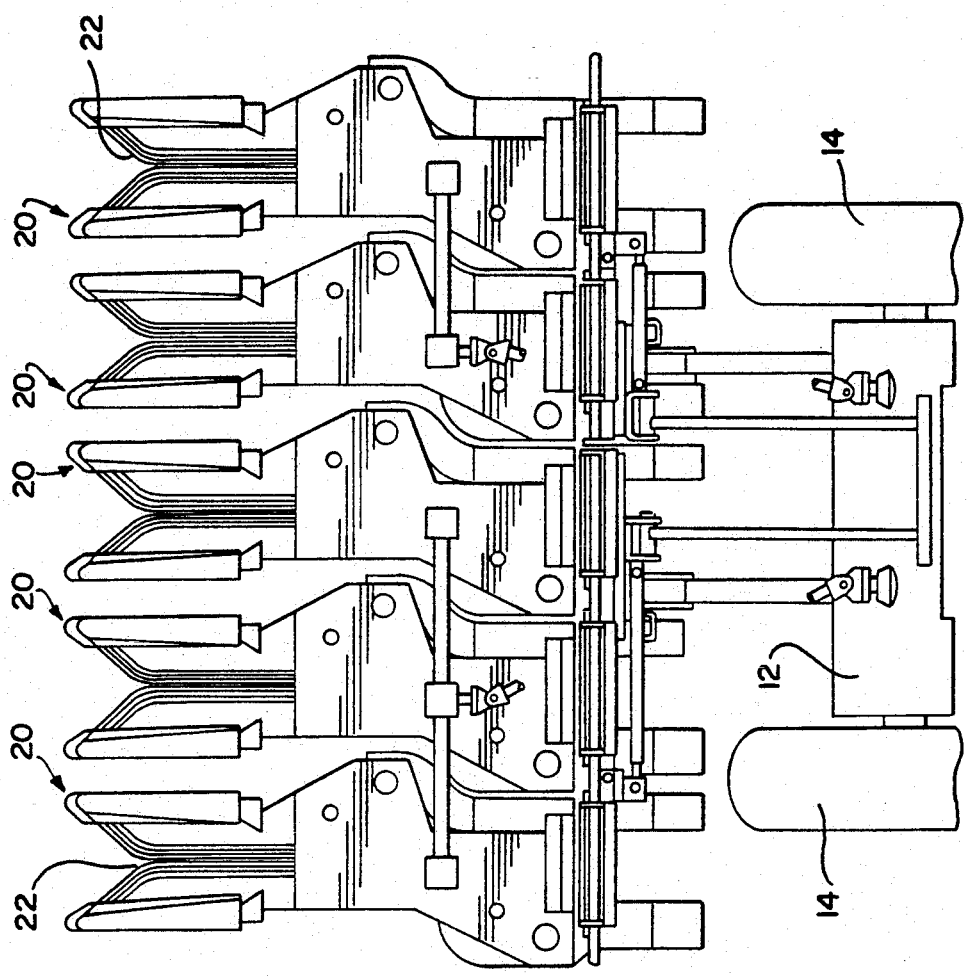
FIG. 2 is a schematic top plan view of a front end of the cotton harvester illustrated in FIG. 1.

A plurality of individual harvesting units 20 are mounted to a front end of frame 12 for harvesting cotton from plants passing between the front pair of drive wheels 14. As shown in FIG. 2, the harvesting units 20 are mounted in side-by-side order relative to each other and extend substantially across the width of frame 12. U.S. Pat. No. 5,010,718 issued Apr. 30, 1991, the full teachings of which are incorporated herein by reference, discloses structure for individually mounting the harvesting units adjacent their aft end for rocking movement relative to frame 12. The individualized mounting structure for each harvesting unit furthermore allows each harvesting unit to be independently moved transversely relative to an adjacent harvesting unit thereby adjusting for various row widths between rows of plants to be harvested and to facilitate servicing of the harvesting units. As shown in FIG. 2, each harvesting unit defines a plant passage 22 which allows a plant row to pass through the harvesting unit as the harvester is driven across the field and a harvesting mechanism (not shown) for picking cotton from the plants.

Figure 3:
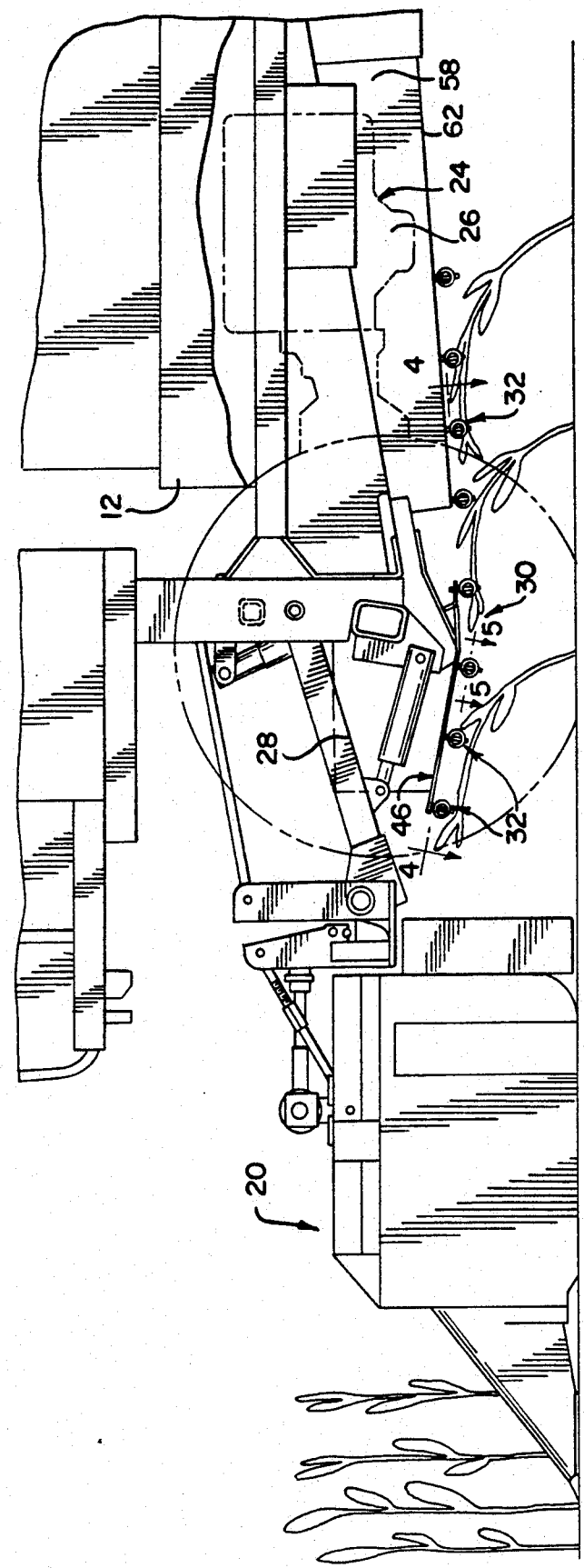
FIG. 3 is an enlarged side elevational view with parts broken away to illustrate the plant deflector assembly as mounted to a cotton harvester.

As shown in FIG. 3, harvester 10 further includes a drive assembly or train 24 for self-propelling the harvester across the field. Drive assembly 24 preferably includes an engine 26 arranged in combination with a multi-speed transmission 28. Engine 26 and transmission 28 are each mounted on the open frame 12 of the harvester. As will appreciated, engine 26 and transmission 28 each include a plurality of operating components (not shown) some of which require daily maintenance and service and which are accessible through the open frame 12 from beneath the harvester.

What has been described heretofore is a substantially conventional structure on a row crop harvester. As will be appreciated, different model crop harvesters may have different structure from that described above but it should be understood that the features of the harvester described above are of a general nature and form no significant part of the present invention.

According to the present invention, a plant deflector assembly 30 is provided on an underside of frame 12 to inhibit plants and foliage thereon passing beneath frame 12 from entangling with operating components on the drive assembly. In the illustrated embodiment, the plant deflector assembly 30 passes beneath at least a portion of the drive assembly 24 and preferably extends from an area adjacent the forward end of frame 12 and extends rearwardly to an area adjacent engine 26.

Figure 4:
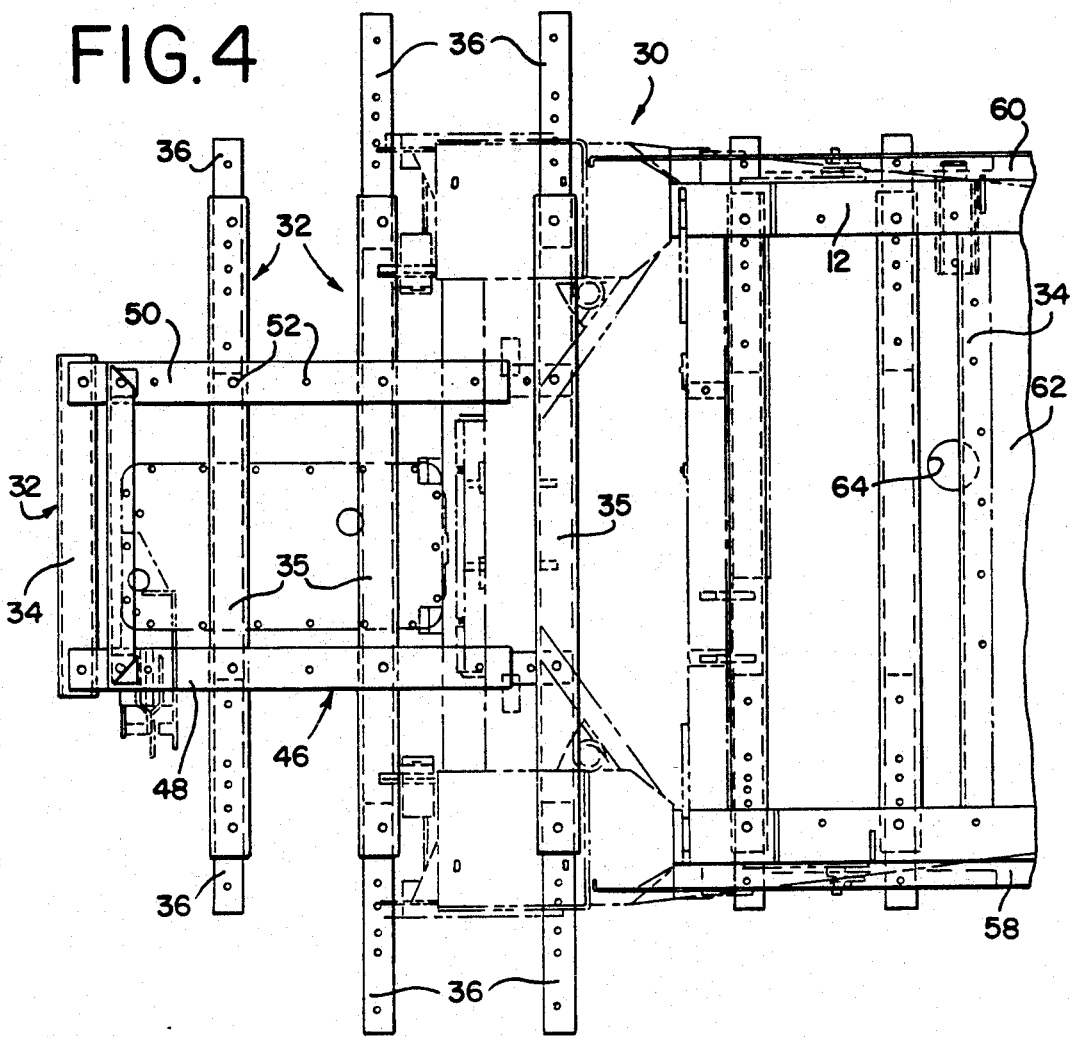
FIG. 4 is a top plan view taken along line 4—4 of FIG. 3.

As shown in FIGS. 3 and 4, the plant deflector assembly 30 includes a series of fore-and-aft spaced elongated plant deflector members 32 mounted to frame 12. Each plant deflector member 32 extends transversely across the frame 12 in a direction generally perpendicular to the direction of travel of the harvester.

The plant deflector member 32 can take different forms. In one embodiment, and as shown at opposite ends of the assembly 30, deflector member 32 is fabricated from an elongated preferably tubular deflector member or piece 34. Alternatively, the deflector member 32 can be configured such that its operable length can be readily and individually adjusted as a function of the position of the member 32 along the frame 12 of the harvester. In this alternative form, the deflector member 32 is comprised of an elongated preferably tubular deflector piece 35 with plant deflector pieces 36 telescopically mounted preferably at both ends of the deflector piece 35 so as to allow extension and retraction of the piece 36 relative to piece 35. Deflector piece 35 has an elongated tubular configuration which extends substantially across the width of harvester frame 12. Separate plant deflector pieces 36, therefore, can telescopically extend from opposite ends of piece 35. In the illustrated embodiment, deflector pieces 34, 35, and 36 are fabricated from a non-metallic preferably tubular plastic material to minimize the weight thereof. Alternatively, however, deflector pieces 34, 35, 36 could be fabricated from hollow elongated metallic pieces to enhance their wear resistance.

Figure 5:
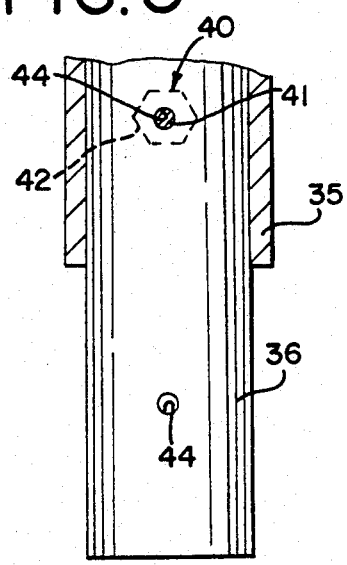
FIG. 5 is a fragmentary sectional view taken along line 5—5 of FIG. 3.

As shown in FIG. 5, locking means 40 releasably hold deflector pieces 35, 36 to each other to prevent inadvertent movement of deflector pieces 36 relative to piece 35 during operation of the harvester. In the illustrated embodiment, locking means 40 comprises an elongated bolt 41 which passes through both pieces 35, 36 and is held in place by a suitable threaded nut 42. As shown in FIGS. 4 and 5, each piece 36 may be provided with a series of transversely spaced holes 44 which allows pieces 36 to extend from piece 35 at varying lengths.

As shown in FIGS. 3 and 4, the plant deflector assembly 30 may further include a mounting 46. Mounting 46 promotes fabrication of and facilitates attachment of the plant deflector assembly 30 to the harvester 12. As shown in FIG. 4, the mounting 46 is configured to be readily fastened to an underside of the harvester frame and includes a pair of fore-and-aft extending and generally parallel arms 48 and 50. Each mounting arm 48, 50 defines a series of fore-and-aft mounting holes 52 to facilitate released affixation of the plant deflector members 32 thereto in an adjustable fashion.

Figure 6:
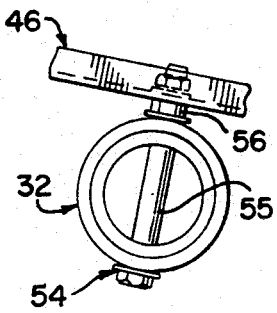
FIG. 6 is an enlarged side elevational view illustrating a plant deflector member securement to a portion of the cotton harvester.

As shown in FIG. 6, suitable means 54 releasably secure each plant deflector member 32 to the mounting 46. In the illustrated embodiment, the releasable means includes an elongated threaded bolt 55 which passes through the plant deflector member 32 and is secured to mounting 46 as with a threaded nut 56. The plurality of holes 52 in the arms 48, 50 allow the fore-and-aft spacing between plant deflector members 32 to be adjusted as required depending upon particular crop conditions.

In the preferred form of the invention, and toward a rear end as shown in FIGS. 3 and 4, the plant deflector assembly 30 further includes generally planar side panels 58 and 60 and a generally horizontal bottom panel 62 provided in the area of engine 28. As shown in FIG. 4, panel 62 is provided with an opening 64 to allow escapement of engine oils and other operating fluids from the engine compartment or area.

Besides vertically deflecting the plants and inhibiting either the plant or foliage thereon from entangling with operating components on the drive assembly 24, the spacing between the transversely extending deflector members 32 provides manual access to the drive assembly 24 as required for daily maintenance. As will understood, the spacing between the deflector members 32 can be readily adjusted to accommodate for crop conditions. By vertically deflecting the plants, the foliage thereon is directed away from the operating components of the drive assembly with minimum damage being done thereto.

Mounting 46 provides a simple and quick method of assembling the plant deflector assembly 30 to the harvester. To further promote assembly, the plant deflector members 32 can be preassembled to the mounting 46 so as to further reduce the amount of time required for servicing of the harvester.

The extensible/retractable relation of the plant deflector pieces 35, 36 allow the operable length of each plant deflector member 32 to be customized to the particular area of the harvester to which the member 32 is providing protection. As an example, the operable length of the deflector members 32 in the area of the front drive wheels can be varied in length such that the distal end of deflector piece 36 is arranged proximate to the inner surface of the wheel 14 thereby inhibiting plants and foliage thereon from rising into contact with operating components. Moreover, having the plant deflector members 32 extend transversely across the frame allows the plant spacing between adjacent harvesting units to be adjusted to infinite settings without requiring further adjustment of the plant deflector assembly 30.

The panel structure 58 and 60 preferably arranged toward a rear end of the plant deflector assembly 30 enhances the ability of assembly 30 to deflect plants from the drive assembly 24. As will be appreciated, the side panels and 58 and 60 may be vertically slanted upwardly and outwardly from the bottom panel 62 and yet offer protection for the operating components encompassed thereby.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

WHAT IS CLAIMED IS:

1. A cotton harvester having a fore-and-aft extending open frame supported for movement over a field of cotton plants by a front pair of drive wheels and a rear pair of steering wheels, a plurality of harvesting units mounted to a front end of the frame for harvesting cotton from plants passing between the front pairs of drive wheels, a drive train for powering the harvester across the field and including an engine and transmission mounted on said open frame, and a plant deflector assembly comprising:

a series of fore-and-aft spaced elongated plant deflector members mounted to an underside of said frame to pass beneath at least a portion of the drive train and extend transversely across said frame for vertically deflecting and inhibiting plants passing between said pair of drive wheels from rising into contact with the drive train and becoming entangled therewith, said series of spaced members being mounted to extend from an area adjacent the forward of said frame and extend rearwardly to an area adjacent said engine.

2. The cotton harvester according to claim 1 wherein each plant deflector member includes at least two plant deflector pieces telescopically arranged relative to each other such that the length of a respective plant deflector member can be adjusted as a function of the fore-and-aft position of the deflector member along the length of the open frame.

3. The cotton harvester according to claim 1 wherein each plant deflector member is fabricated from hollow plastic tubing.

4. The cotton harvester according to claim 1 wherein said plant deflector assembly further includes a mounting to which the series of fore-and-aft spaced plant deflector members are releasably secured.

5. The cotton harvester according to claim 4 wherein said mounting includes a pair of fore-and-aft extending and generally parallel arms, with each arm defining a series of fore-and-aft arranged mounting holes to facilitate released affixation of the plant deflector members thereto in an adjustable fashion.

6. The cotton harvester according to claim 5 wherein the plant deflector members are configured such that their individual length can be varied according to their respective fore-and-aft orientation on the frame of the harvester.

7. A crop harvester adapted for movement over a field of row crops, said crop harvester including an open frame supported for movement over the field by front and rear pairs of wheels, a plurality of fore-and-aft extending harvesting units mounted from the frame in side-by-side order relative to each other and extending substantially across the width of the frame, each harvesting unit being mounted adjacent the aft end thereof for rocking and transverse movement relative to the frame, drive means including an engine and transmission combination mounted on the frame for propelling the harvester forward, and a plant deflector assembly comprising:

a plurality of extensible/retractable plant deflectors arranged on an underside of and extending transversely across said frame for vertically deflecting and inhibiting plants passing between the outermost harvesting units from rising into contact with the drive means and becoming entangled therewith, said plurality of plant deflectors being mounted to extend from an area adjacent a forward end of said frame and extend rearwardly to an area adjacent said engine.

8. A plant deflector assembly adapted for mounting to an open frame of a row crop harvester which is movable over a field of plants, said plant deflector assembly comprising:

a mounting apparatus adapted for securement to the open frame of the row crop harvester, said mounting apparatus including at least two fore-and-aft extending and generally parallel arms adapted to extend generally parallel to the harvester frame when said mounting apparatus is secured thereto, with each arm having a series of mounting holes defined therein;

a series of elongated plant deflector members adapted for releasable securement to said mounting apparatus; and fasteners for releasably securing each plant deflector member to the parallel arms of said mounting apparatus such that the members extend transversely across said frame when the deflector assembly is secured thereto for vertically deflecting and inhibiting plants passing under said frame from becoming entangled with operating components of the harvester.

9. The plant deflector assembly according to claim 8 wherein a plurality of said plant deflector members are comprised of an elongated tubular member secured to the arms of the mounting apparatus and with separate plant deflector pieces telescopically extending from opposite ends of the tubular member such that the operable length of such plant deflector members can be readily and individually adjusted as a function of the position of the plant deflector members along the length of the mounting apparatus.

10. The plant deflector assembly according to claim 8 wherein said plant deflector members are fabricated from hollow elongated tubular plastic.

11. The plant deflector assembly according to claim 8 wherein said plant deflector members are fabricated from hollow elongated metallic pieces to enhance their wear resistance.

* * * * *